United States Patent
Bhamri et al.

(10) Patent No.: US 12,550,158 B2
(45) Date of Patent: Feb. 10, 2026

(54) METHODS, CONFIGURATION, AND SIGNALING FOR UPLINK TRANSMISSION SWITCHING

(71) Applicant: Apple Inc., Cupertino, CA (US)

(72) Inventors: Ankit Bhamri, Bad Nauheim (DE); Sigen Ye, San Diego, CA (US); Wei Zeng, Saratoga, CA (US); Dawei Zhang, Saratoga, CA (US); Yang Tang, San Jose, CA (US)

(73) Assignee: Apple Inc., Cupertino, CA (US)

( * ) Notice: Subject to any disclaimer, the term of this patent is extended or adjusted under 35 U.S.C. 154(b) by 315 days.

(21) Appl. No.: 18/114,098

(22) Filed: Feb. 24, 2023

(65) Prior Publication Data
US 2023/0354358 A1 Nov. 2, 2023

Related U.S. Application Data

(60) Provisional application No. 63/335,914, filed on Apr. 28, 2022.

(51) Int. Cl.
*H04W 72/23* (2023.01)
*H04W 72/12* (2023.01)
(Continued)

(52) U.S. Cl.
CPC ..... *H04W 72/231* (2023.01); *H04W 72/1268* (2013.01)

(58) Field of Classification Search
CPC .......... H04W 72/231; H04W 72/1268
See application file for complete search history.

(56) References Cited

U.S. PATENT DOCUMENTS

2023/0156608 A1 5/2023 Park et al.
2024/0357681 A1* 10/2024 Rastegardoost ........ H04W 8/22

FOREIGN PATENT DOCUMENTS

WO  WO 2021/201658 A1  10/2021
WO  WO 2022/011543 A1  1/2022
WO  WO 2022/076599 A1  4/2022

OTHER PUBLICATIONS

Huawei, HiSilicon: "Updated views on Rel-18 uplink enhancement", 3GPP TSG RAN Meeting #93-e, Electronic Meeting, Sep. 13-17, 2021, RP-212151, 15 pages, Retrieved from the Internet at URL:https://ftp.3gpp.org/tsg_ran/TSG_RAN/TSGR_93e/Docs/RP-212151.zip.

(Continued)

*Primary Examiner* — Ronald B Abelson
(74) *Attorney, Agent, or Firm* — Sterne, Kessler, Goldstein & Fox P.L.L.C.

(57) ABSTRACT

Some embodiments are disclosed for Uplink (UL) Transmission (Tx) switching in a wireless network. Some embodiments a base station (BS) can receive first UL Txs, transmit, a dynamic trigger signal for UL Tx switching, where a number of configured UL Tx switching bands, M, is greater than a maximum number of UL Tx chains, N, where M and N are integers. The BS can receive second UL Txs according to the dynamic trigger signal. In some examples, the first UL Txs and the second UL Txs correspond to a first pair of bands of the M configured UL Tx switching bands, or the first UL Txs correspond to a first pair of bands of the M configured UL Tx switching bands, and the second UL Txs correspond to one band of the first pair of bands and a different band of the M configured UL Tx switching bands.

20 Claims, 6 Drawing Sheets

(51) Int. Cl.
*H04W 72/1268* (2023.01)
*H04W 72/231* (2023.01)

(56) References Cited

OTHER PUBLICATIONS

Huawei, HiSilicon: "Comments on Rel-18 uplink draft WID", 3GPP TSG RAN#94, Electronic Meeting, Dec. 6-17, 2021, RP-213159, 5 pages, Retrieved from the Internet at https://ftp.3gpp.org/tsg_ran/TSG_RAN/TSGR_94e/Docs/RP-213159.zip.

International Search Report and Written Opinion of the International Searching Authority directed to related International Patent Application No. PCT/US2023/019444, mailed Aug. 14, 2023; 13 pages.

NTT Docomo, Inc., "New WID on Multi-carrier enhancements," RP-213577 (revision of RP-213564), 3GPP TSG RAN Meeting #94e, Electronic Meeting, Dec. 6-17, 2021, 5 pages.

Huawei, HiSilicon, China Telecom, "WID revision: RF requirements for NR frequency range 1 (FR1)," RP-192292 (revision of RP-191114), 3GPP TSG RAN Meeting #84, Newport Beach, USA, Sep. 16-20, 2019, 5 pages.

Huawei, China Telecom, CMCC, China Unicom, "New WID on UE Conformance—RF requirements enhancements for NR frequency range 1 (FR1)," RP-221848 (was RP-221493), 3GPP TSG RAN Meeting #96, Budapest, Hungary, Jun. 6-9, 2022, 3 pages.

ETSI, "5G; NR; Physical layer procedures for data (3GPP TS 38.214 version 16.6.0 Release 16)," Aug. 2021, pp. 1-175.

Moderator (Huawei, HiSilicon), "New WID on Further RF requirements enhancement for NR frequency range 1 (FR1)," 3GPP TSG RAN Meeting #95e, Electronic Meeting, Mar. 17-23, 2022, RP-22xxxx; 5 pages.

3GPP TS 38.306 V17.0.0 (Mar. 2022), 3rd Generation Partnership Project; Technical Specification Group Radio Access Network; NR; User Equipment (UE) radio access capabilities (Release 17); 174 pages.

3GPP TS 38.331 V17.0.0 (Mar. 2022), 3rd Generation Partnership Project; Technical Specification Group Radio Access Network; NR; Radio Resource Control (RRC) protocol specification (Release 17); 1221 pages.

\* cited by examiner

METHODS, CONFIGURATION, AND SIGNALING FOR UPLINK TRANSMISSION SWITCHING

CROSS-REFERENCE TO RELATED APPLICATIONS

The present application claims the benefit of U.S. Provisional Patent Application No. 63/335,914, filed on Apr. 28, 2022, which is hereby incorporated by reference in its entirety.

BACKGROUND

Field

The embodiments relate generally to wireless devices that initiate and/or perform transmission switching in a wireless communication system.

Related Art

Uplink (UL) Transmission (Tx) switching schemes include UL Tx switching cases for up to 2 configured frequency bands and 2 Tx chains.

SUMMARY

Some embodiments include an apparatus, method, and computer program product for Uplink (UL) Transmission (Tx) switching in a wireless network. Some embodiments include a base station (BS) that can receive first UL Txs. The BS can transmit, subsequent to receiving a UL Tx of the first UL Txs, a dynamic trigger signal for UL Tx switching, where a number of configured UL Tx switching bands, M, is greater than a maximum number of UL Tx chains, N, where M and N are integers, and receive second UL Txs according to the dynamic trigger signal.

The BS can transmit a request for UL Tx switching capabilities of a user equipment (UE), and receive a response including a switching gap corresponding to the UL Tx switching. The BS can then transmit UL Tx switching configuration data via Radio Resource Control (RRC) signaling, where the UL Tx switching configuration data indicates a switching gap category corresponding to the switching gap.

In some examples, when the N maximum number of UL Tx chains is greater than 2, to receive the first UL Txs, the BS can receive two UL Txs of the first UL Txs via a first pair of bands of the M configured UL Tx switching bands, and receive a third UL Tx of the first UL Txs via a different band of the M configured UL Tx switching bands. The BS can receive a fourth UL Tx via the different band during a switching gap corresponding to the dynamic trigger signal.

In some embodiments, the first UL Txs and the second UL Txs correspond to a first pair of bands of the M configured UL Tx switching bands. In some embodiments, the first UL Txs correspond to a first pair of bands of the M configured UL Tx switching bands, and the second UL Txs correspond to one band of the first pair of bands and a different band of the M configured UL Tx switching bands. In some embodiments, the first UL Txs correspond to a first pair of bands of the M configured UL Tx switching bands, and the second UL Txs correspond to a different pair of bands of the M configured UL Tx switching bands.

Some embodiments include a UE that can transmit first UL Txs, and receive, subsequent to transmitting a UL Tx of the first UL Txs, a dynamic trigger signal for UL Tx switching, where a number of configured UL Tx switching bands, M, is greater than a maximum number of UL Tx chains, N, where M and N are integers. The UE can perform the UL Tx switching according to the dynamic trigger signal, and transmit second UL Txs according to the UL Tx switching.

The UE can receive UL Tx switching configuration data via RRC signaling, where the UL Tx switching configuration data indicates a switching gap category corresponding to a switching gap of the UL Tx switching. Where the N maximum number of UL Tx chains is greater than 2, to transmit the first UL Txs, the UE can transmit two UL Txs of the first UL Txs via a first pair of bands of the M configured UL Tx switching bands, and transmit a third UL Tx of the first UL Txs via a different band of the M configured UL Tx switching bands. The UE can transmit a fourth UL Tx via the different band during a switching gap corresponding to the dynamic trigger signal. In some embodiments, the dynamic trigger signal includes a Downlink Control Information (DCI) signal that can include an indication of next state bands of the M configured UL Tx switching bands, and a number of ports for UL Tx corresponding respectively, to the next state bands.

In some embodiments, the first UL Txs and the second UL Txs correspond to a first pair of bands of the M configured UL Tx switching bands. In some embodiments, the first UL Txs correspond to a first pair of bands of the M configured UL Tx switching bands, and the second UL Txs correspond to one band of the first pair of bands and a different band of the M configured UL Tx switching bands. In some embodiments, the first UL Txs correspond to a first pair of bands of the M configured UL Tx switching bands, and the second UL Txs correspond to a different pair of bands of the M configured UL Tx switching bands.

BRIEF DESCRIPTION OF THE FIGURES

The accompanying drawings, which are incorporated herein and form part of the specification, illustrate the presented disclosure and, together with the description, further serve to explain the principles of the disclosure and enable a person of skill in the relevant art(s) to make and use the disclosure.

Figure 1:
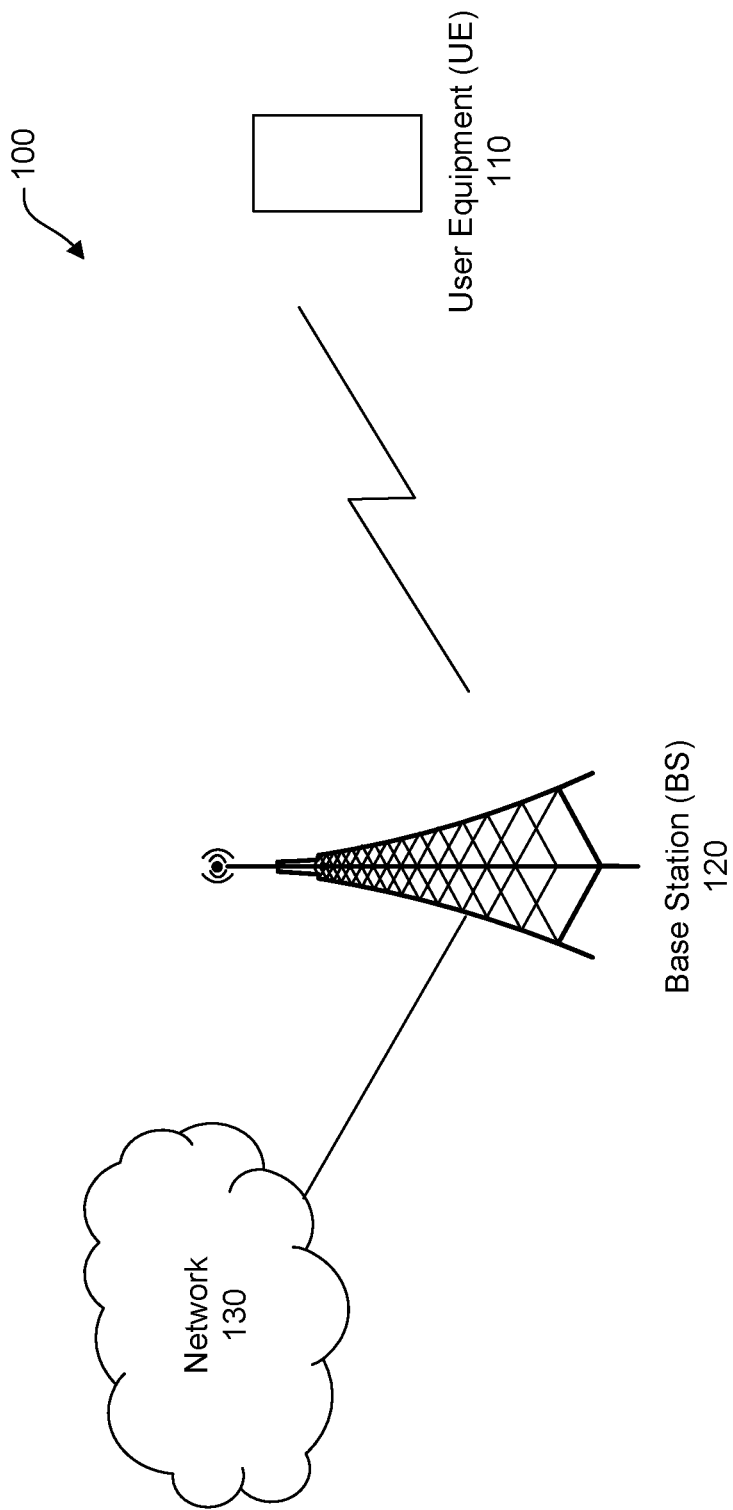
FIG. 1 illustrates an example system for Uplink (UL) Transmission (Tx) switching, in accordance with some embodiments of the disclosure.

The presented disclosure is described with reference to the accompanying drawings. In the drawings, generally, like reference numbers indicate identical or functionally similar elements. Additionally, generally, the left-most digit(s) of a reference number identifies the drawing in which the reference number first appears.

DETAILED DESCRIPTION

Some embodiments include configuration, dynamic selection, and Uplink (UL) Transmission (Tx) switching in a wireless network when the number of configured bands, M, are greater than the maximum number of UL Tx chains, N. For example, when the maximum number of UL Tx chains is N=2 and the number of configured bands is M=3 or 4, some embodiments include the switching cases for UL Tx switching on up to 2 bands from the set of 3 or 4 bands configured. Some embodiments include identifying switching cases that do not allow for any UL Tx during the switching gap, a time duration when UL Tx switching is performed (e.g., if reported by a UE). Some embodiments include specifying sets of switching cases across multiple bands where no UL Tx can be scheduled during the active bands of the multiple bands.

FIG. 1 illustrates example system 100 for Uplink (UL) Transmission (Tx) switching, in accordance with some embodiments of the disclosure. System 100 can include UE 110, base station (BS) 120, and network 130. UE 110 can include, but is not limited to: wireless communication devices, smart phones, laptops, desktops, tablets, personal assistants, monitors, televisions, wearable devices, Internet of Things (IoTs), vehicle communication devices, and the like. BS 120 can include nodes configured to operate based on a wide variety of wireless communication techniques such as, but not limited to, techniques based on 3rd Generation Partnership Project (3GPP) standards. For example, base stations 120 can include nodes (e.g., an evolved Node B (eNB), a next generation Node B (gNB), a transmission reception point (TRP), etc.) configured to operate using Rel-17 or another 3GPP standard. Network 130 can include wired and/or wireless communications networks which may include any combination of local area networks (LANs), wide area networks (WANs), the Internet, etc.

If UE 110 supports UL Tx switching, some embodiments include a switching mechanism that enables UL Tx switching across 3 or 4 bands. In some examples, dynamic UL Tx switching (e.g., carrier switching) can occur between the switching cases supported by UE 110 based on the UL scheduling (e.g., via dynamic grant and/or Radio Resource Control (RRC) configuration) for UL transmissions.

UE 110 can operate in Switched UL mode and Dual UL mode as shown below in Table 1.

TABLE 1

| User Equipment (UE) Uplink (UL) Modes | | | |
|---|---|---|---|
| | E-UTRA New Radio (NR) Dual Connectivity (EN-DC) (no simultaneous Tx on NR and E-UTRA) | Inter-band Carrier Aggregation (CA) | Supplementary UpLink (SUL) |
| Configured With UL switching (no specific mode) | N/A | Switching from 2 port Tx on one carrier to 1 port Tx on another carrier or vice-versa | Switching any uplink transmission from one uplink carrier to another uplink carrier |
| Option 1: Switched UL mode | Switching from 1 port Tx on one NR carrier to 1 port TX on one E-UTRA carrier or vice-versa | Switching from 1 port Tx on one carrier to 1 port Tx on another carrier | |
| Option 2: Dual UL mode | Switching from 2 port Tx on one NR carrier to 1 port TX on one E-UTRA carrier | Switching from 1 port Tx on one carrier to 2 port Tx on the same carrier, when current state not support 2 port transmission | |
| | Switching from 1 port Tx on one E-UTRA carrier to 2 port TX on one NR carrier | Switching from 1 port Tx on one carrier to 1 port Tx on another carrier, when current state on the same carrier support 2 port transmission | |
| | | Switching from 1 port Tx on one carrier of one band to 2 port Tx on a carrier of the same band, when current state not support 2 port transmission | |
| | | Switching from 2 port Tx on one band to 2 port Tx on another band | |

For Switched UL mode, when UE 110 supports up to 2 ports for UL Tx on the configured bands, M, in the band combination, only switching cases (e.g., Tx chain states) with 2 transmissions (2T) are included. When 3 bands are configured (e.g., M=3), UE 110 may utilize 3 switching cases: ({2T,0T,0T}, {0T,2T,0T}, {0T,0T,2T}.) For example, 0T means no Tx chain is associated with that band, 1T means 1 Tx chain is associated with a band, and 2Tx means both Tx chains are associated with a band.

In an example, when M=3, bands A, B, and C may be active. The choices indicate that 2 ports may be active on band A, 2 ports may be active on band B, or 2 ports may be active on band C. In the case of 4 bands being configured (e.g., M=4), 4 switching cases can be utilized by UE 110: ({2T,0T,0T,0T}, {0T,2T,0T,0T}, {0T,0T,2T,0T}, {0T,0T,0T,2T}.) In some embodiments, a switching gap is needed for every UL transmission with a changed transmission band from a preceding transmission band (e.g., UL Tx switching.) In other words, UE 110 may use the time of a switching gap to perform UL Tx switching from a first UL transmission band to a second UL transmission band.

For Dual UL mode, when UE 110 supports concurrent transmission on configured band pairs and supports up to 2 ports UL transmission on the configured bands in the band combination, all possible switching cases with 1T-1T and 2T are assumed. In the case of 3 bands, 6 switching cases are possible for UE 110: ({2T,0T,0T}, {0T,2T,0T}, {0T,0T,2T}, {1T, 1T, 0T}, {1T, 0T, 1T}, {0T, 1T, 1T}.) In the case of 4 bands, 10 switching cases are possible for UE 110: ({2T, 0T,0T,0T}, {0T,2T,0T,0T}, {0T,0T,2T,0T}, {0T,0T,0T,2T}, {1T,1T,0T,0T}, {1T,0T,1T,0T}, {1T,0T,0T,1T}, {0T,1T,1T, 0T}, {0T,1T,0T,1T}, {0T,0T,1T,1T}.)

A number of configured bands, M, can be configured for communication between BS 120 and UE 110. UE 110 may be capable of transmitting a maximum number of UL Tx chains, N, where M and N are integers.

In some embodiments, UL Tx switching utilizes a combination index of configured bands, M. In some embodiments, UL Tx switching can occur across any of the configured bands, M. These embodiments are described below.

UL Tx Switching Using a Combination Index of Configured Bands

In some embodiments, when M>N (e.g., the M configured bands in a combination are greater than the N maximum number of UL Tx chains that can be simultaneously used by UE 110), a subset of the configured bands in combination can be dynamically activated and/or triggered. For example, combinations of a pair of bands from the M configured bands can be assigned to a corresponding combination index. BS 120 can configure UE 110 with the combination indexes. Subsequently, BS 120 can dynamically activate and/or trigger UL Tx switching at UE 110 by transmitting a signal (e.g., a dynamic trigger signal) that includes a combination index to UE 110. UE 110 can receive the signal and perform UL Tx switching across the bands corresponding to the combination index, and then send UL Tx(s) on the transmission bands corresponding to the combination index. Another pair combination can be activated and/or triggered with a second signal (e.g., a second dynamic trigger signal) that includes a same and/or a different combination index. Accordingly, additional complexities at UE 110 are avoided as no new switching cases are defined even though M=4 bands are configured.

As an example and not a limitation, M=4 configured bands (e.g., band A, band B, band C, band D), and N=2 maximum number of UL Tx chains simultaneously used by UE 110. UE 110 can be configured (e.g., semi-statically via RRC signaling) for UL Tx switching. Multiple combinations of a pair of bands from the 4 configured bands can be determined and UE 110 can be configured with combination indexes via RRC signaling as shown in Table 2 below:

TABLE 2

| Combination Index of Configured Bands | |
| --- | --- |
| Combination Index | Carrier 1 in, Carrier 2 in |
| 0 | Band A, Band B |
| 1 | Band A, Band C |
| 2 | Band A, Band D |
| 3 | Band B, Band C |
| 4 | Band B, Band D |

TABLE 2-continued

| Combination Index of Configured Bands | |
| --- | --- |
| Combination Index | Carrier 1 in, Carrier 2 in |
| 5 | Band C, Band D |

The maximum number of activated and/or triggered bands in a combination index can be equal to or less than the maximum number of UL TX chains that can be simultaneously used at UE 110. In this example, a combination index can activate and/or trigger 2 or less bands of the 4 configured bands since N=2.

After configuration of UE 110, BS 120 can transmit a signal including a combination index to dynamically activate and/or trigger UL Tx switching (e.g., the signaling can be via Downlink Control Information (DCI) and/or Medium Access Control (MAC) Control Element (CE)). As an example, UE 110 may be operating in bands A and B. UE 110 can receive the signal and determine the two carrier bands with which UL TX switching can be performed. If the signal includes combination index 4, then UE 110 would perform UL Tx switching and then send UL Txs via carrier 1 in band B and carrier 2 in band D.

UL Tx Switching Across Any of Configured Bands

In some embodiments, when a number of configured bands, M, is greater than the maximum number of UL Tx chains, N, that can be simultaneously used at UE 110, then the UL Tx switching can be dynamically triggered and/or activated across any of the configured bands, M, where the simultaneous transmission is limited to N maximum number of UL Tx chains. For example, when N=2 maximum UL Tx chains and M=4 configured bands, UL Tx switching can be dynamically triggered and/or activated across any of the 4 configured bands where the simultaneous transmission is limited to 2.

In an example where M=4 and N=2, 4 bands may be configured: band A, band B, band C, and band D. The bands may be configured via RRC signaling for UL Tx switching with 2 UL Tx chains. Some examples of switching cases (e.g., in Switched UL mode and Dual UL mode) illustrating allowed dynamic UL Tx switching across the 4 bands with a maximum of 2 bands at a time, are shown in Table 3 for Switched UL mode with 4 bands, and Table 4 for Dual UL mode with 4 bands. Table 4 shows similar cases, with the addition of simultaneous transmissions added to cases 1-6 based for simultaneous dual UL transmissions.

BS 120 can transmit a dynamic indication such as a signal (e.g., a dynamic trigger signal via DCI or MAC CE) to trigger switching from one case to another case as shown in Table 3 for Switched UL mode or Table 4 for Dual UL mode. If DCI signaling is transmitted, two related fields in the DCI can be used. The indication of carrier index indicator field can identify which of the bands is used in the next state (e.g., index 0 may indicate band A, index 1 may indicate band B, index 2 may indicate band C and index 3 may indicate band D. The indication of how many ports field can identify the number of ports to be used for UL Tx on the indicated band of the carrier index indicator.

TABLE 3

Switched UL with 4 Bands

| | Number of Tx chains: band A + band B + band C + band D | Number of antenna ports band A + band B + band C + band D |
|---|---|---|
| Case 1 | 1T + 1T + 0T + 0T | 1P + 0P + 0P + 0P or 0P + 1P + 0P + 0P |
| Case 2 | 1T + 0T + 1T + 0T | 1P + 0P + 0P + 0P or 0P + 0P + 1P + 0P |
| Case 3 | 1T + 0T + 0T + 1T | 1P + 0P + 0P + 0P or 0P + 0P + 0P + 1P |
| Case 4 | 0T + 1T + 1T + 0T | 0P + 1P + 0P + 0P or 0P + 0P + 1P + 0P |
| Case 5 | 0T + 1T + 0T + 1T | 0P + 1P + 0P + 0P or 0P + 0P + 0P + 1P |
| Case 6 | 0T + 0T + 1T + 1T | 0P + 0P + 1P + 0P or 0P + 0P + 0P + 1P |
| Case 7 | 2T + 0T + 0T + 0T | 2P + 0P + 0P + 0P or 1P + 0P + 0P + 0P |
| Case 8 | 0T + 2T + 0T + 0T | 0P + 2P + 0P + 0P or 0P + 1P + 0P + 0P |
| Case 9 | 0T + 0T + 2T + 0T | 0P + 0P + 2P + 0P or 0P + 0P + 1P + 0P |
| Case 10 | 0T + 0T + 0T + 2T | 0P + 0P + 0P + 2P or 0P + 0P + 0P + 1P |

In an example, UE 110 may operate in Switched UL mode according to case 1 in Table 3 where there are two UL Tx chains that transmit on bands A and B. Since simultaneous transmissions are not possible in Switched UL mode, UE 110 can transmit using one port (1P) on band A or using 1P on band B (e.g., UE 110 can first transmit using 1P on band A and then transmit using 1P on band B.) If UE 110 receives a dynamic trigger signal indicating case 2 (e.g., receive a DCI signal indicating the bands and corresponding number of ports: index 0 (band A), P1 and index 2 (band C), 1P), UE 110 performs UL Tx switching from band B to band C, and can transmit on one port (1P).

In an example, UE 110 may operate in Dual UL mode according to case 1 in Table 4 where there are two UL Tx chains that transmit on bands A and B at alternative times (like the Switched UL mode) or simultaneously (e.g., 1P+1P+0P+0P) since simultaneous transmissions are possible in Dual UL mode. As an example, assume that UE 110 transmits using one port (1P) on band A and 1P on band B simultaneously. If UE 110 receives a dynamic trigger signal indicating case 2 (e.g., receive a DCI signal indicating the bands and corresponding number of ports: index 0 (band A), P1 and index 2 (band C), 1P), UE 110 can perform UL Tx switching from case 1 with bands A and B to the next state of case 2 with bands A and C (e.g., 1P+0P+1P+0P as shown in Table 4.)

TABLE 4

Dual UL with 4 Bands

| | Number of Tx chains: band A + band B + band C + band D | Number of antenna ports band A + band B + band C + band D |
|---|---|---|
| Case 1 | 1T + 1T + 0T + 0T | 1P + 0P + 0P + 0P or 0P + 1P + 0P + 0P or 1P + 1P + 0P + 0P |
| Case 2 | 1T + 0T + 1T + 0T | 1P + 0P + 0P + 0P or 0P + 0P + 1P + 0P or 1P + 0P + 1P + 0P |
| Case 3 | 1T + 0T + 0T + 1T | 1P + 0P + 0P + 0P or 0P + 0P + 0P + 1P or 1P + 0P + 0P + 1P |
| Case 4 | 0T + 1T + 1T + 0T | 0P + 1P + 0P + 0P or 0P + 0P + 1P + 0P or 0P + 1P + 1P + 0P |
| Case 5 | 0T + 1T + 0T + 1T | 0P + 1P + 0P + 0P or 0P + 0P + 0P + 1P or 0P + 1P + 0P + 1P |
| Case 6 | 0T + 0T + 1T + 1T | 0P + 0P + 1P + 0P or 0P + 0P + 0P + 1P or 0P + 0P + 1P + 1P |
| Case 7 | 2T + 0T + 0T + 0T | 2P + 0P + 0P + 0P or 1P + 0P + 0P + 0P |
| Case 8 | 0T + 2T + 0T + 0T | 0P + 2P + 0P + 0P or 0P + 1P + 0P + 0P |
| Case 9 | 0T + 0T + 2T + 0T | 0P + 0P + 2P + 0P or 0P + 0P + 1P + 0P |
| Case 10 | 0T + 0T + 0T + 2T | 0P + 0P + 0P + 2P or 0P + 0P + 0P + 1P |

Figure 2:
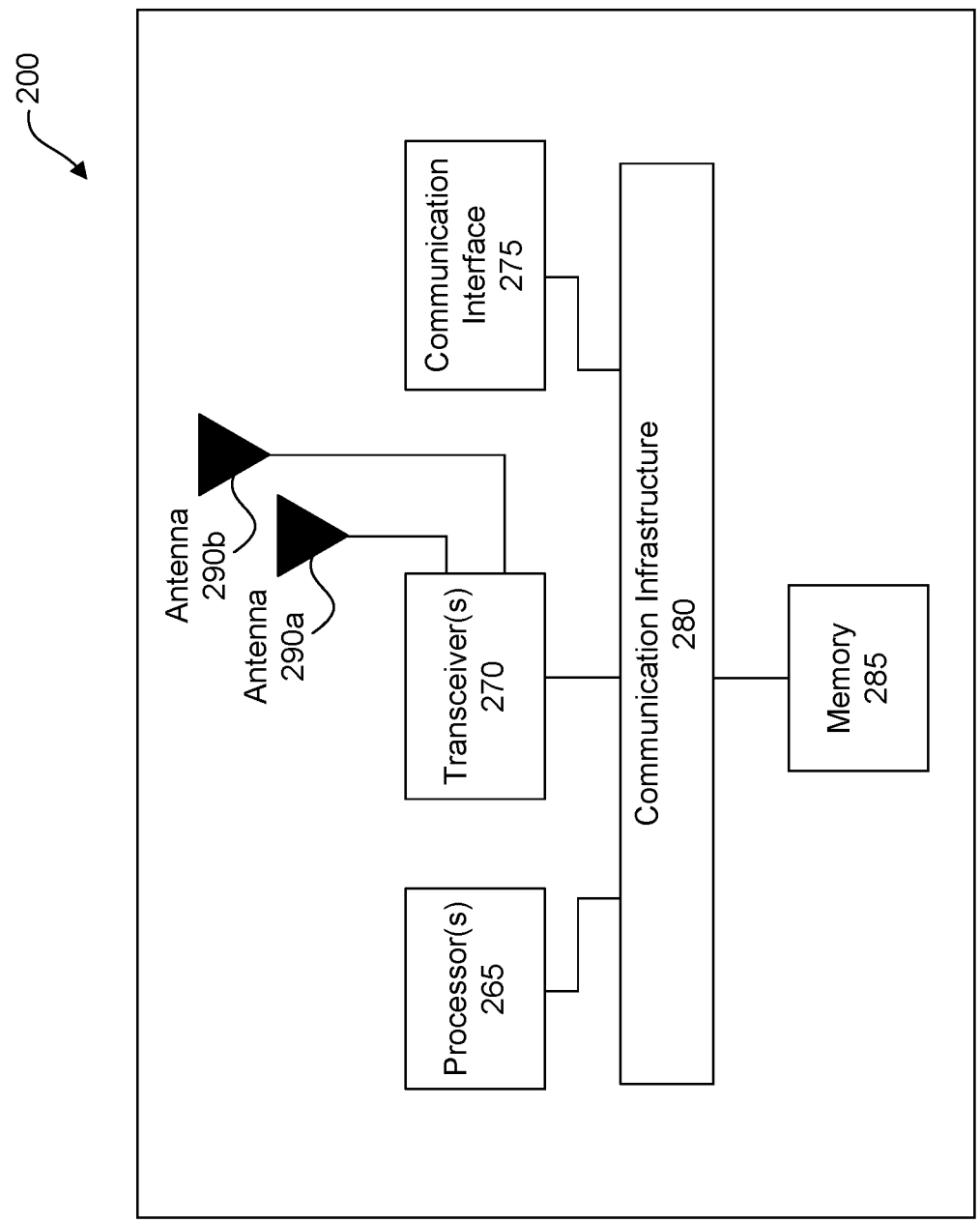
FIG. 2 illustrates a block diagram of an example wireless system supporting UL Tx switching, according to some embodiments of the disclosure.

FIG. 2 illustrates a block diagram of example wireless system 200 supporting UL Tx switching, according to some embodiments of the disclosure. For explanation purposes and not a limitation, FIG. 2 may be described with reference to elements from FIG. 1. For example, system 200 may be any of the electronic devices of system 100 (e.g., UE 110, BS 120.) System 200 includes one or more processors 265, transceiver(s) 270, communication interface 275, communication infrastructure 280, memory 285, and antenna 290. Memory 285 may include random access memory (RAM) and/or cache, and may include control logic (e.g., computer instructions) and/or data. One or more processors 265 can execute the instructions stored in memory 285 to perform operations enabling wireless system 200 to transmit and receive wireless communications, including the operations for supporting and/or performing or supporting UL Tx switching described herein. In some embodiments, one or more processors 265 can be "hard coded" to perform the functions herein. Communication interface 275 allows system 200 to communicate with other devices that may be wired and/or wireless. Communication infrastructure 280 may be a bus. Transceiver(s) 270 transmits and receives wireless communications signals including wireless communications supporting and/or performing UL Tx switching according to some embodiments, and may be coupled to one or more antennas 290 (e.g., 290a, 290b). Antennas 290a and/or 290b may include one or more antennas that may be the same or different types.

Figure 3:
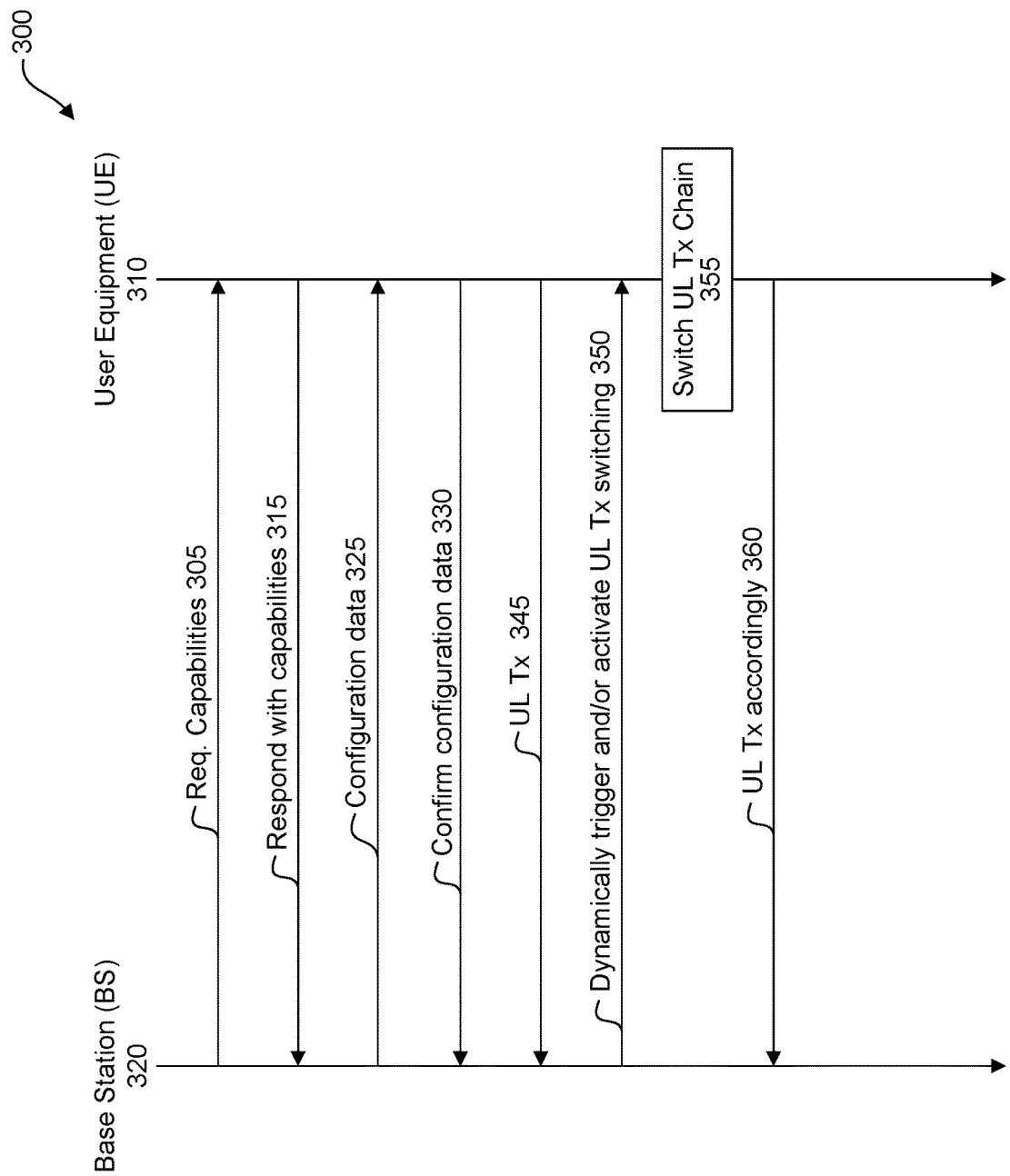
FIG. 3 illustrates an example of communications supporting UL Tx switching, according to some embodiments of the disclosure.

FIG. 3 illustrates example 300 of communications supporting UL Tx switching, according to some embodiments of the disclosure. For explanation purposes and not a limitation, FIG. 3 may be described with reference to elements from FIG. 1 and FIG. 2. For example, system 300 includes UE 310 and BS 320 that can be UE 110 and BS 120 of FIG. 1. In addition, UE 310 and BS 320 can be system 200 of FIG. 2.

At 305, BS 320 can transmit a request to UE 310 inquiring whether or not UE 310 supports UL Tx switching, including the case of UL Tx switching with M>N where the M configured bands in a combination are greater than the N maximum number of UL Tx chains that can be simultaneously used by UE 310.

At 315, UE 310 can transmit a response to BS 320 indicting whether or not UE 310 supports UL Tx switching. In some embodiments, UE 310 can indicate whether UE 310 supports combination index corresponding to certain bands of the M configured bands and/or UL Tx Switching across any of the M configured bands.

If UE 310 responds with UL Tx switching capability as "NotSupported", then UE 310 is not expected to be configured for UL Tx switching including the case of UL Tx switching with M>N. In other words, the network (e.g., BS 320) can assume UL Tx switching not supported and will not transmit signals to dynamically trigger and/or activate UL Tx switching for UE 310. If UE 310 reports "Supported", UE 310 can be further configured and receive dynamic trigger signals for UL Tx switching. In some examples, UE 310 can indicate support for combination indexes, and/or various switching cases across any of the M configured bands as shown in Table 3 and/or Table 4. UE 310 can also indicate one or more switching gaps. A switching gap can be a duration of time when a UL Tx switching occurs.

When UE 310 supports UL Tx switching, UE 310 can also indicate switching gap categories that correspond to switching gaps. Examples of categories 1-3 are shown below (e.g., when N=2):

Category 1: When the current state of UL Tx switching includes a first pair of bands of the M configured bands, and the next state of UL Tx switching will include the same bands as the first pair of bands, (e.g., no new band is included.)

Category 2: When the current state of UL Tx switching includes first pair of bands of the M configured bands, and the next state of UL Tx switching will involve a second pair of bands: one band from the first pair of bands and a different band of the M configured bands.

Category 3: When the current state of UL Tx switching includes first pair of bands of the M configured bands, and the next state of UL Tx switching will involve a second pair of bands with no band from the first pair of bands, (e.g., a completely different pair of bands is included in the second pair of bands.)

In some embodiments, UE 310 reports if, and for which category that UE 310 requires a switching gap. UE 310 can report the requirements of switching gaps for all categories, or a subset of the categories. In other words, UE 310 is not required to support all of the three categories.

At 325, BS 320 can transmit configuration data to UE 310. In some examples, the configuration data includes a combination index of configured bands (e.g., Table 2), switching cases for Switched UL mode (e.g., Table 3), and/or switched cases for Dual UL mode (e.g., Table 4.)

At 330, UE 310 can transmit a confirmation signal confirming receipt of the confirmation data received.

At 345, UE 310 can transmit UL Txs to BS 320.

At 350, BS 320 can transmit a signal to dynamically trigger and/or activate UL Tx switching. The signal can be a DCI signal and/or a MAC CE signal. For example, BS 320 can transmit a dynamic indication such as a signal (e.g., a dynamic trigger signal via DCI or MAC CE) to trigger switching from one pair of bands to another pair of bands as noted by the combination index (e.g., Table 2) in the DCI signal and/or the MAC CE signal.

In another example, the DCI and/or MAC CE can indicate switching cases for Switched UL mode (e.g., Table 3) or switching cases for Dual UL mode (e.g., Table 4.) If DCI signaling is transmitted, two related fields in the DCI can be used. The indication of carrier index indicator field can identify which of the bands of the M configured bands is used in the next state (e.g., index 0 may indicate band A, index 1 may indicate band B, index 2 may indicate band C and index 3 may indicate band D. The indication of how many ports field can identify the number of ports to be used for UL Tx on the indicated band of the carrier index indicator.

At 355, UE 310 performs UL Tx switching during the switching gap corresponding to the signal received from BS 320 and the configuration data.

If the signal includes a combination index of configured bands (e.g., UE 310 is configured with Table 2), then UE 310 performs UL Tx switching on the bands identified according to the combination index during a corresponding switching gap (if UE 310 identified a switching gap at 315.) In some embodiments, when N>2 and M>N, UE 310 can send a UL Tx (not shown) on a different band of M during the switching gap, where the different band is not involved with the UL Tx switching.

If the signal indicates switching cases (e.g., bands and corresponding ports) for Switched UL mode (e.g., Table 3) or switching cases for Dual UL mode (e.g., Table 4), UE 310 performs UL Tx switching during the switching gap according to the configuration data (e.g., configured category.) For a category for which no switching gap requirement is reported, UE 310 does not need additional time for PUSCH preparation.

If UE 310 is capable of supporting 3 UL Tx chains, and 2 of the UL Tx chains are involved on UL Tx switching during the switching gap. During the switching gap the third remaining UL Tx chain can be used for UL transmission on a different band than those used during for UL Tx switching.

In some embodiments, when UE 310 reported a switching gap for category 1 and is configured accordingly, UL switching category 1 is applied (e.g., no different bands are used between the current state and next state). UE 310 can expect to be scheduled during the switching gap with UL transmissions on the other configured bands that are currently not involved in the UL Tx switching.

For a category for which a switching gap requirement is reported, the switching cases are defined, if any, for which no UL transmission is allowed on the active bands of the M configured bands during the switching gap as shown in Tables 5-8 below.

In some embodiments, when category 2 UL Tx switching is applied and a switching gap is configured for category 2, then for a set of switching cases, UE 310 is not expected to be scheduled with any UL transmissions on the active bands of the M configured bands. The following set of switching cases shown below in Table 5 apply for both Switched UL and Dual UL modes with 4 configured bands with 1Tx-1Tx switching. Active bands are shown as bolded font.

As an example of category 2 switching gap cases with no Tx (1TX-1TX switching) (e.g., no UL Tx on the active bands involved in the 1TX-1TX switching), UE 310 can operate in switching case 1 with a transmission in band A and/or band B, and UE 310 can receive a signal (e.g., at 350) that dynamically triggers UL Tx switching to case 2. At 355, UE 310 can perform UL Tx switching during a switching gap to change to transmitting in band A and/or band C. During the switching gap, UE 310 does not transmit on any of bands A, B, and/or C as shown in the first row of Table 5.

TABLE 5

Category 2 Switching Gap Cases with No Tx (1TX-1TX Switching)

case 1 (1T + 1T + 0T + 0T) to/from case 2 (1T + 0T + 1T + 0T)
case 1 (1T + 1T + 0T + 0T) to/from case 3 (1T + 0T + 0T + 1T)
case 1 (1T + 1T + 0T + 0T) to/from case 4 (0T + 1T + 1T + 0T)
case 1 (1T + 1T + 0T + 0T) to/from case 5 (0T + 1T + 0T + 1T)
case 2 (1T + 0T + 1T + 0T) to/from case 3 (1T + 0T + 0T + 1T)
case 2 (1T + 0T + 1T + 0T) to/from case 4 (0T + 1T + 1T + 0T)
case 2 (1T + 0T + 1T + 0T) to/from case 6 (0T + 0T + 1T + 1T)
case 3 (1T + 0T + 0T + 1T) to/from case 5 (0T + 1T + 0T + 1T)
case 3 (1T + 0T + 0T + 1T) to/from case 6 (0T + 0T + 1T + 1T)
case 4 (0T + 1T + 1T + 0T) to/from case 5 (0T + 1T + 0T + 1T)
case 4 (0T + 1T + 1T + 0T) to/from case 6 (0T + 0T + 1T + 1T)
case 5 (0T + 1T + 0T + 1T) to/from case 6 (0T + 0T + 1T + 1T)

In some embodiments, when category 3 UL Tx switching is applied and a switching gap is configured for category 3, then for a set of switching cases, UE 310 is not expected to be scheduled with any UL transmission on the active configured bands. The following set of switching cases shown below in Tables 6-8 apply for both Switched UL and Dual UL modes. For example, Table 6 illustrates 1Tx-1Tx switching (e.g., changing from one band with 1P to a second band with 1P.) Active bands are shown as bolded font.

As an example of category 3 switching gap cases with no Tx (1TX-1TX switching), UE 310 can operate in switching case 1 with a transmission in band A and/or band B, and UE 310 can receive a signal (e.g., at 350) that dynamically triggers UL Tx switching to case 6. At 355, UE 310 can perform UL Tx switching during a switching gap to change to transmitting in band C and/or band D. During the switching gap, UE 310 does not transmit on any of bands A, B, C and/or D as shown in the first row of Table 6.

TABLE 6

Category 3 Switching Gap Cases with No Tx (1TX-1TX Switching)

case 1 (1T + 1T + 0T + 0T) to/from case 6 (0T + 0T + 1T + 1T)
case 2 (1T + 0T + 1T + 0T) to/from case 5 (0T + 1T + 0T + 1T)
case 3 (1T + 0T + 0T + 1T) to/from case 4 (0T + 1T + 1T + 0T)

Table 7 illustrates 1Tx-2Tx switching (e.g., changing from one band with 1P to a second band with 2 ports (2P.)) Active bands are shown as bolded font.

As an example of category 3 switching gap cases with no Tx (1TX-2TX switching), UE 310 can operate in switching case 1 with a transmission in band A and/or band B, and UE 310 can receive a signal (e.g., at 350) that dynamically triggers UL Tx switching to case 9-1. Note that cases 9-1, 9-2, and 9-3 are identical. At 355, UE 310 can perform UL Tx switching during a switching gap to change to transmitting on 2 ports in band C. During the switching gap, UE 310 does not transmit on any of bands A, B, C and/or D as shown in the first row of Table 7.

TABLE 7

Category 3 Switching Gap Cases with No Tx (1TX-2TX Switching)

case 1 (1T + 1T + 0T + 0T) to/from case 9-1 (0T + 0T + 2T + 0T)
case 1 (1T + 1T + 0T + 0T) to/from case 10-1 (0T + 0T + 0T + 2T)
case 2 (1T + 0T + 1T + 0T) to/from case 8-1 (0T + 2T + 0T + 0T)
case 2 (1T + 0T + 1T + 0T) to/from case 10-2 (0T + 0T + 0T + 2T)
case 3 (1T + 0T + 0T + 1T) to/from case 8-2 (0T + 2T + 0T + 0T)
case 3 (1T + 0T + 0T + 1T) to/from case 9-2 (0T + 0T + 2T + 0T)
case 4 (0T + 1T + 1T + 0T) to/from case 7-1 (2T + 0T + 0T + 0T)
case 4 (0T + 1T + 1T + 0T) to/from case 10-3 (0T + 0T + 0T + 2T)
case 5 (0T + 1T + 0T + 1T) to/from case 7-2 (2T + 0T + 0T + 0T)
case 5 (0T + 1T + 0T + 1T) to/from case 9-3 (0T + 0T + 2T + 0T)
case 6 (0T + 0T + 1T + 1T) to/from case 7-3 (2T + 0T + 0T + 0T)
case 6 (0T + 0T + 1T + 1T) to/from case 8-3 (0T + 2T + 0T + 0T)

Table 8 illustrates 2Tx-2Tx switching (e.g., changing from one band with 2P to a second band with 2P.) Active bands are shown as bolded font. Variations of cases (e.g., 7-1, 7-2, 7-3) indicate different "0T" bands that are active.

As an example of category 3 switching gap cases with no Tx (2TX-2TX switching), UE 310 can operate in switching case 7-1 with transmissions on 2 ports in band A, and UE 310 can receive a signal (e.g., at 350) that dynamically triggers UL Tx switching to case 8-2. At 355, UE 310 can perform UL Tx switching during a switching gap to change to transmitting on 2 ports in band B and/or no ports in band C. During the switching gap, UE 310 does not transmit on any of bands A, B, C and/or D as shown in the first row of Table 8.

TABLE 8

Category 3 Switching Gap Cases with No Tx (2TX-2TX Switching)

case 7-1 (2T + 0T + 0T + 0T) to/from case 8-2 (0T + 2T + 0T + 0T)
case 7-1 (2T + 0T + 0T + 0T) to/from case 9-2 (0T + 0T + 2T + 0T)
case 7-2 (2T + 0T + 0T + 0T) to/from case 8-1 (0T + 2T + 0T + 0T)
case 7-2 (2T + 0T + 0T + 0T) to/from case 10-2 (0T + 0T + 0T + 2T)
case 7-3 (2T + 0T + 0T + 0T) to/from case 9-1 (0T + 0T + 2T + 0T)
case 7-3 (2T + 0T + 0T + 0T) to/from case 10-1 (0T + 0T + 0T + 2T)
case 8-1 (0T + 2T + 0T + 0T) to/from case 9-3 (0T + 0T + 2T + 0T)
case 8-2 (0T + 2T + 0T + 0T) to/from case 10-3 (0T + 0T + 0T + 2T)
case 8-3 (0T + 2T + 0T + 0T) to/from case 9-1 (0T + 0T + 2T + 0T)
case 8-3 (0T + 2T + 0T + 0T) to/from case 10-1 (0T + 0T + 0T + 2T)
case 9-2 (0T + 0T + 2T + 0T) to/from case 10-3 (0T + 0T + 0T + 2T)
case 9-3 (0T + 0T + 2T + 0T) to/from case 10-2 (0T + 0T + 0T + 2T)

Returning to system 300 of FIG. 3, at 360, UE 310 transmits UL Txs on the bands corresponding to the signal (e.g., on the bands identified in the DCI or MAC CE.)

Figure 4:
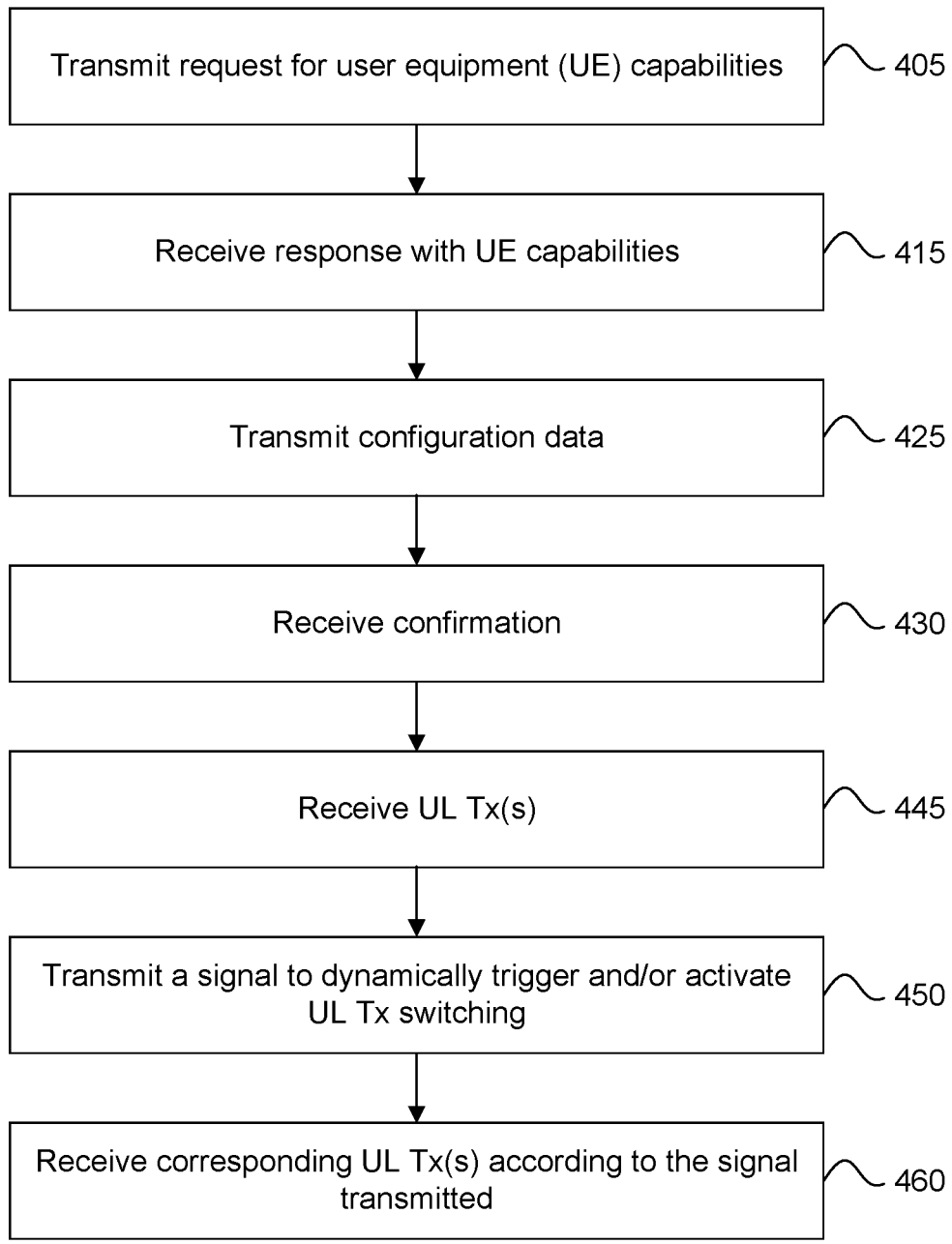
FIG. 4 illustrates an example method for a base station (BS) supporting UL Tx switching, according to some embodiments of the disclosure.

FIG. 4 illustrates example method 400 for a base station (BS) supporting UL Tx switching, according to some embodiments of the disclosure. For explanation purposes and not a limitation, FIG. 4 may be described with reference to elements from FIGS. 1-3. For example, method 400 can be performed by BS 120 of FIG. 1, system 200 of FIG. 2, or BS 320 of FIG. 3.

At 405, BS 320 can transmit a request for UE 310 capabilities.

At 415, BS 320 can receive a response with UE 310 capabilities.

At 425, BS 320 can transmit configuration data to UE 310 according to the response received at 415.

At 430, BS 320 can receive a confirmation from UE 310 regarding the configuration data.

At 445, BS 320 can receive UL Tx(s) from UE 310.

At 450, BS 320 can transmit a signal to dynamically trigger and/or activate UL Tx switching (e.g., via DCI or MAC CE) signaling.

At 460, BS 320 can receive corresponding UL Tx(s) according to the signal transmitted.

Figure 5:
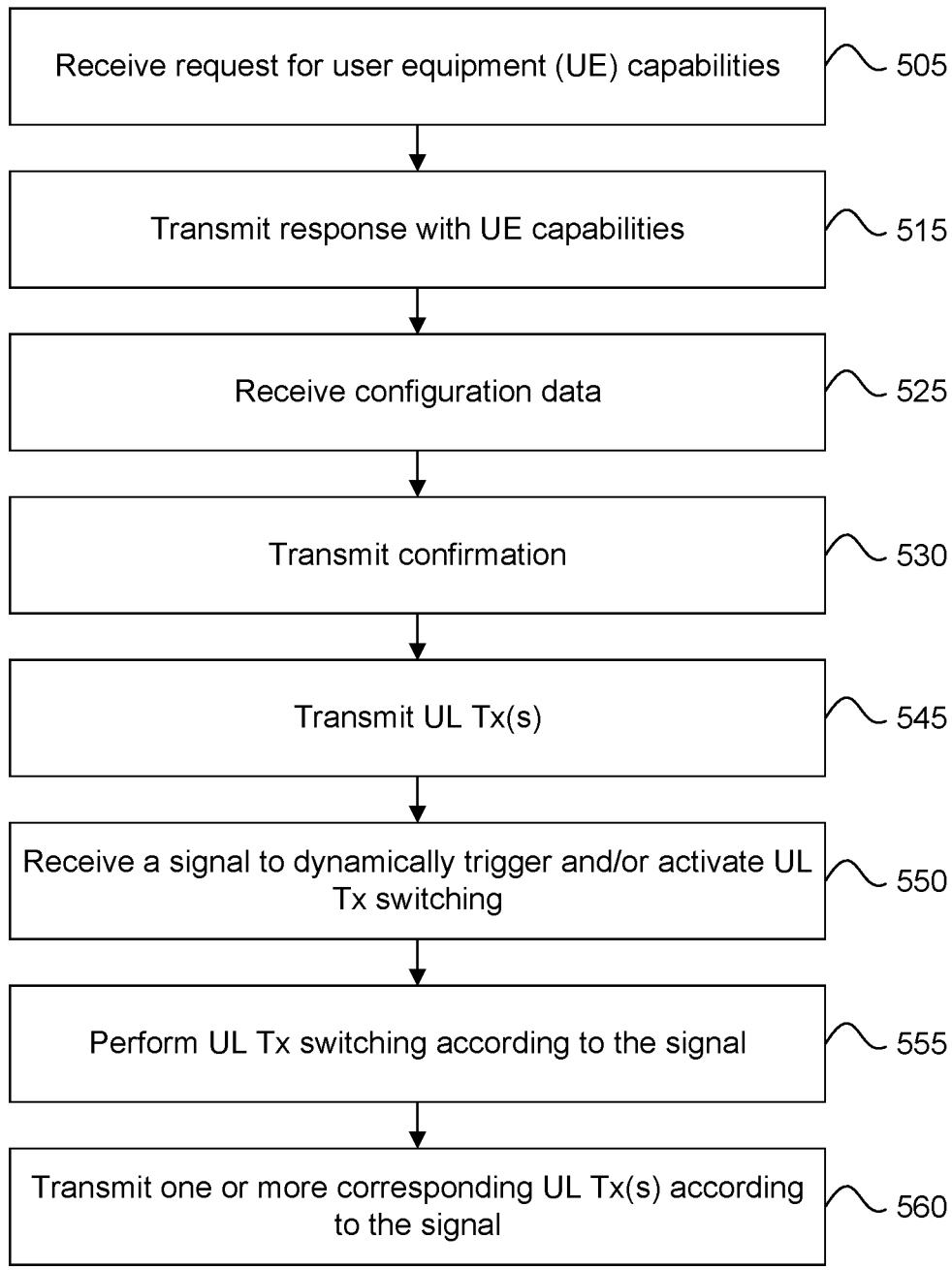
FIG. 5 illustrates an example method for a user equipment (UE) supporting UL Tx switching, according to some embodiments of the disclosure.

FIG. 5 illustrates example method 500 for a user equipment (UE) supporting UL Tx switching, according to some embodiments of the disclosure. For explanation purposes and not a limitation, FIG. 5 may be described with reference to elements from FIGS. 1-3. For example, method 500 can be performed by UE 110 of FIG. 1, system 200 of FIG. 2, or UE 310 of FIG. 3.

At 505, UE 310 can receive from BS 320, a request for UE 310 (also system 200's) capabilities.

At 515, UE 310 can transmit to BS 320, a response with UE 310 capabilities.

At 525, UE 310 can receive configuration data from BS 320.

At 530, UE 310 can transmit to BS 320, confirmation of receipt of the configuration data.

At 545, UE 310 can transmit UL Tx(s) to BS 320.

At 550, UE 310 can receive a signal to dynamically trigger and/or activate UL Tx switching.

At 555, UE 310 can perform UL Tx switching according to the signal.

At 560, UE 310 can transmit one or more corresponding UL Tx(s) according to the signal.

Figure 6:
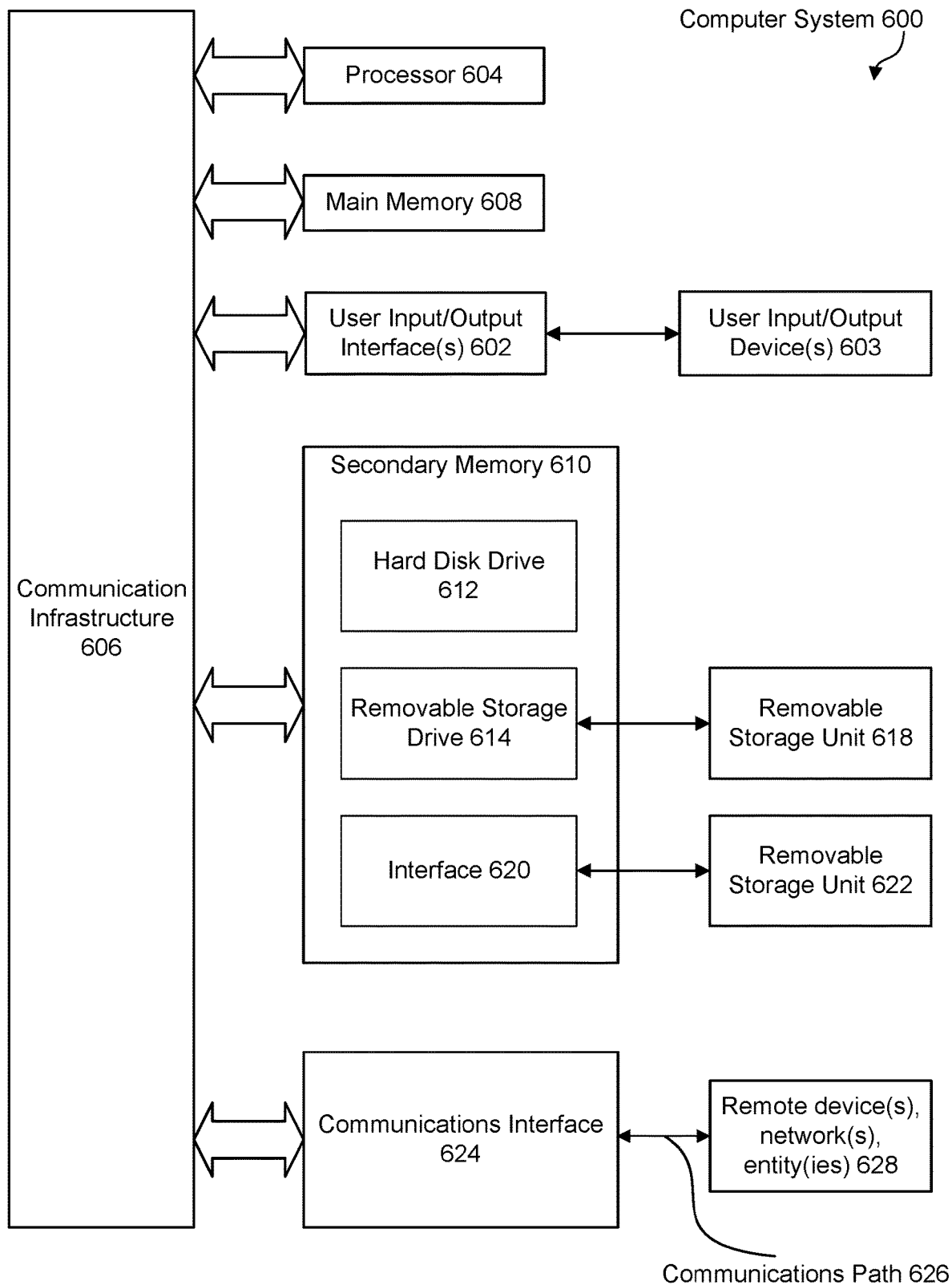
FIG. 6 is an example computer system for implementing some embodiments or portion(s) thereof.

Various embodiments can be implemented, for example, using one or more well-known computer systems, such as computer system 600 shown in FIG. 6. Computer system 600 can be any well-known computer capable of performing the functions described herein. For example, and without limitation, UE 110, BS 120, UE 310, and BS 320 of FIGS. 1 and 3, system 200 of FIG. 2, methods 400 and 500 FIGS. 4 and 5, (and/or other apparatuses and/or components shown in the figures) may be implemented using computer system 600, or portions thereof.

Computer system 600 includes one or more processors (also called central processing units, or CPUs), such as a processor 604. Processor 604 is connected to a communication infrastructure 606 that can be a bus. One or more processors 604 may each be a graphics processing unit (GPU). In an embodiment, a GPU is a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 600 also includes user input/output device(s) 603, such as monitors, keyboards, pointing devices, etc., that communicate with communication infrastructure 606 through user input/output interface(s) 602. Computer system 600 also includes a main or primary memory 608, such as random access memory (RAM). Main memory 608 may include one or more levels of cache. Main memory 608 has stored therein control logic (e.g., computer software) and/or data.

Computer system 600 may also include one or more secondary storage devices or memory 610. Secondary memory 610 may include, for example, a hard disk drive 612 and/or a removable storage device or drive 614. Removable storage drive 614 may be a floppy disk drive, a magnetic tape drive, a compact disk drive, an optical storage device, tape backup device, and/or any other storage device/drive.

Removable storage drive 614 may interact with a removable storage unit 618. Removable storage unit 618 includes a computer usable or readable storage device having stored thereon computer software (control logic) and/or data. Removable storage unit 618 may be a floppy disk, magnetic tape, compact disk, DVD, optical storage disk, and/any other computer data storage device. Removable storage drive 614 reads from and/or writes to removable storage unit 618 in a well-known manner.

According to some embodiments, secondary memory 610 may include other means, instrumentalities or other approaches for allowing computer programs and/or other instructions and/or data to be accessed by computer system 600. Such means, instrumentalities or other approaches may include, for example, a removable storage unit 622 and an interface 620. Examples of the removable storage unit 622 and the interface 620 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 600 may further include a communication or network interface 624. Communication interface 624 enables computer system 600 to communicate and interact with any combination of remote devices, remote networks, remote entities, etc. (individually and collectively referenced by reference number 628). For example, communication interface 624 may allow computer system 600 to communicate with remote devices 628 over communications path 626, which may be wired and/or wireless, and which may include any combination of LANs, WANs, the Internet, etc. Control logic and/or data may be transmitted to and from computer system 600 via communication path 626.

The operations in the preceding embodiments can be implemented in a wide variety of configurations and architectures. Therefore, some or all of the operations in the preceding embodiments may be performed in hardware, in software or both. In some embodiments, a tangible, non-transitory apparatus or article of manufacture includes a tangible, non-transitory computer useable or readable medium having control logic (software) stored thereon is also referred to herein as a computer program product or program storage device. This includes, but is not limited to, computer system 600, main memory 608, secondary memory 610 and removable storage units 618 and 622, as well as tangible articles of manufacture embodying any combination of the foregoing. Such control logic, when executed by one or more data processing devices (such as computer system 600), causes such data processing devices to operate as described herein.

Based on the teachings contained in this disclosure, it will be apparent to persons skilled in the relevant art(s) how to make and use embodiments of the disclosure using data processing devices, computer systems and/or computer architectures other than that shown in FIG. 6. In particular, embodiments may operate with software, hardware, and/or operating system implementations other than those described herein.

It is to be appreciated that the Detailed Description section, and not the Summary and Abstract sections, is intended to be used to interpret the claims. The Summary and Abstract sections may set forth one or more but not all exemplary embodiments of the disclosure as contemplated by the inventor(s), and thus, are not intended to limit the disclosure or the appended claims in any way.

While the disclosure has been described herein with reference to exemplary embodiments for exemplary fields and applications, it should be understood that the disclosure is not limited thereto. Other embodiments and modifications thereto are possible, and are within the scope and spirit of the disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. In addition, alternative embodiments may perform functional blocks, steps, operations, methods, etc. using orderings different from those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein.

The breadth and scope of the disclosure should not be limited by any of the above-described exemplary embodiments, but should be defined only in accordance with the following claims and their equivalents.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should only occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of, or access to, certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

What is claimed is:

1. A base station (BS), comprising:
   a memory; and
   a processor coupled to the memory, configured to:
   transmit a request for uplink (UL) transmission (Tx) switching capabilities of a user equipment (UE);
   receive a response comprising a switching gap corresponding to the UL Tx switching capabilities;
   transmit UL Tx switching configuration data via Radio Resource Control (RRC) signaling, wherein the UL Tx switching configuration data indicates a switching gap category corresponding to the switching gap;
   subsequent to transmitting the UL Tx switching configuration data, receive first UL Txs;
   transmit, subsequent to receiving an UL Tx of the first UL Txs, a dynamic trigger signal for UL Tx switching based at least on the UL Tx switching configuration data, wherein a number of configured UL Tx switching bands, M, is greater than a maximum number of UL Tx chains, N, where M and N are integers; and
   receive second UL Txs according to the dynamic trigger signal.

2. The BS of claim 1, wherein the first UL Txs and the second UL Txs correspond to a first pair of bands of the M configured UL Tx switching bands.

3. The BS of claim 1, wherein the N maximum number of UL Tx chains is greater than 2, to receive the first UL Txs, the processor is configured to:
   receive two UL Txs of the first UL Txs via a first pair of bands of the M configured UL Tx switching bands; and
   receive a third UL Tx of the first UL Txs via a different band of the M configured UL Tx switching bands.

4. The BS of claim 3, wherein the processor is further configured to: receive a fourth UL Tx via the different band during the switching gap corresponding to the dynamic trigger signal.

5. The BS of claim 1, wherein the first UL Txs correspond to a first pair of bands of the M configured UL Tx switching bands, and the second UL Txs correspond to one band of the first pair of bands and a different band of the M configured UL Tx switching bands.

6. The BS of claim 1, wherein the first UL Txs correspond to a first pair of bands of the M configured UL Tx switching bands, and the second UL Txs correspond to a different pair of bands of the M configured UL Tx switching bands.

7. A user equipment (UE), comprising:
   a memory; and
   a processor coupled to the memory, configured to:
   receive uplink (UL) transmission (Tx) switching configuration data via Radio Resource Control (RRC) signaling, wherein the UL Tx switching configuration data indicates a switching gap category corresponding to UL Tx switching capabilities of the UE;
   subsequent to receiving the UL Tx switching configuration data, transmit first UL Txs;
   receive, subsequent to transmitting an UL Tx of the first UL Txs, a dynamic trigger signal for UL Tx switching based at least on the UL Tx switching configuration data, wherein a number of configured UL Tx switching bands, M, is greater than a maximum number of UL Tx chains, N, where M and N are integers;
   perform the UL Tx switching according to the dynamic trigger signal; and
   transmit second UL Txs according to the dynamic trigger signal.

8. The UE of claim 7, wherein the first UL Txs and the second UL Txs correspond to a first pair of bands of the M configured UL Tx switching bands.

9. The UE of claim 7, wherein the N maximum number of UL Tx chains is greater than 2, to transmit the first UL Txs, the processor is configured to:
   transmit two UL Txs of the first UL Txs via a first pair of bands of the M configured UL Tx switching bands; and
   transmit a third UL Tx of the first UL Txs via a different band of the M configured UL Tx switching bands.

10. The UE of claim 9, wherein the processor is further configured to:
    transmit a fourth UL Tx via the different band during the switching gap corresponding to the dynamic trigger signal.

11. The UE of claim 7, wherein the first UL Txs correspond to a first pair of bands of the M configured UL Tx switching bands, and the second UL Txs correspond to one band of the first pair of bands and a different band of the M configured UL Tx switching bands.

12. The UE of claim 7, wherein the first UL Txs correspond to a first pair of bands of the M configured UL Tx switching bands, and the second UL Txs correspond to a different pair of bands of the M configured UL Tx switching bands.

13. The UE of claim 7, wherein the dynamic trigger signal comprises a Downlink Control Information (DCI) signal including: an indication of next state bands of the M configured UL Tx switching bands, and a number of ports for UL Tx corresponding to the next state bands, respectively.

14. A method for a base station (BS), comprising:
transmitting a request for uplink (UL) transmission (Tx) switching capabilities of a user equipment (UE);
receiving a response comprising a switching gap corresponding to the UL Tx switching capabilities;
transmitting UL Tx switching configuration data via Radio Resource Control (RRC) signaling, wherein the UL Tx switching configuration data indicates a switching gap category corresponding to the switching gap;
subsequent to transmitting the UL Tx switching configuration data, receiving first UL Txs;
transmitting, subsequent to receiving an UL Tx of the first UL Txs, a dynamic trigger signal for UL Tx switching based at least on the UL Tx switching configuration data, wherein a number of configured UL Tx switching bands, M, is greater than a maximum number of UL Tx chains, N, where M and N are integers; and
receiving second UL Txs according to the dynamic trigger signal.

15. The method of claim 14, wherein the first UL Txs and the second UL Txs correspond to a first pair of bands of the M configured UL Tx switching bands.

16. The method of claim 14, wherein the N maximum number of UL Tx chains is greater than 2, to receive the first UL Txs, the method comprises:
receiving two UL Txs of the first UL Txs via a first pair of bands of the M configured UL Tx switching bands; and
receiving a third UL Tx of the first UL Txs via a different band of the M configured UL Tx switching bands.

17. The method of claim 16, further comprising: receiving a fourth UL Tx via the different band during the switching gap corresponding to the dynamic trigger signal.

18. The method of claim 14, wherein the first UL Txs correspond to a first pair of bands of the M configured UL Tx switching bands, and the second UL Txs correspond to one band of the first pair of bands and a different band of the M configured UL Tx switching bands.

19. The method of claim 14, wherein the first UL Txs correspond to a first pair of bands of the M configured UL Tx switching bands, and the second UL Txs correspond to a different pair of bands of the M configured UL Tx switching bands.

20. The method of claim 14, wherein the dynamic trigger signal comprises a Downlink Control Information (DCI) signal including: an indication of next state bands of the M configured UL Tx switching bands, and a number of ports for UL Tx corresponding to the next state bands, respectively.

* * * * *